Jan. 17, 1939.                T. A. RICH                 2,144,589
                    THERMAL CURRENT-RESPONSIVE DEVICE
                           Filed July 14, 1934
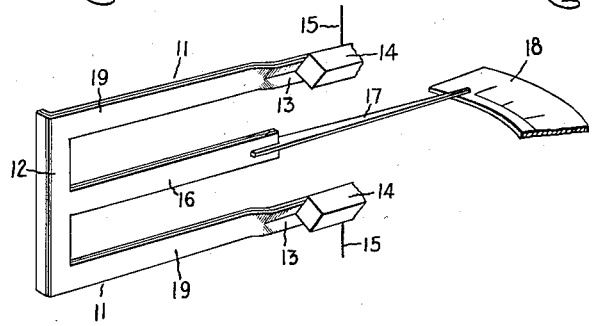
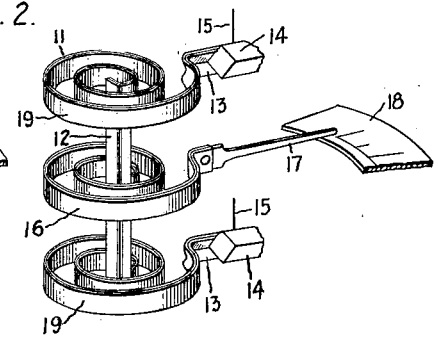
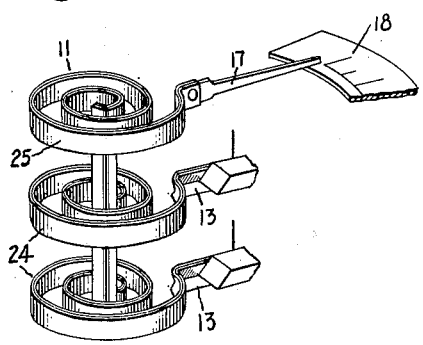
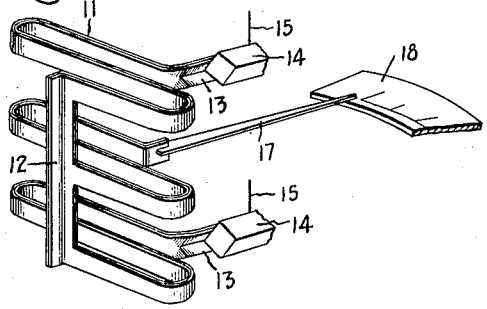
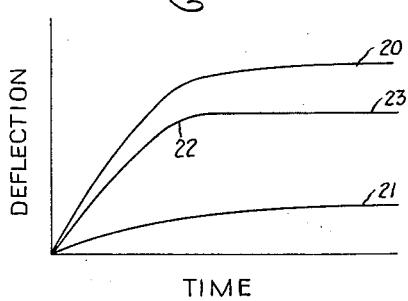
Inventor:
Theodore A. Rich,
by Harry E. Dunham
His Attorney Patented Jan. 17, 1939

2,144,589

UNITED STATES PATENT OFFICE 2,144,589

THERMAL CURRENT-RESPONSIVE DEVICE

Theodore A. Rich, Schenectady, N. Y., assignor to General Electric Company, a corporation of New York Application July 14, 1934, Serial No. 735,227

15 Claims. (Cl. 171—95)

My invention relates to current-responsive devices and concerns particularly devices of the thermal type employing a bimetallic strip.

It is an object of my invention to provide a construction for current-responsive devices which permits obtaining the greater sturdiness and durability, the high available torque and current-carrying capacity, and the relatively low manufacturing cost of devices employing bimetallic strip for the torque-producing element without obtaining the slowness of response ordinarily inherent in such devices.

Other and further objects and advantages will become apparent as the description proceeds.

Owing to the high torque and current-carrying capacity of bimetallic strip current-indicating instruments, it is ordinarily not desirable to employ flexible leads in connection with such instruments. Consequently, U-shaped members formed of bimetallic strips are frequently employed to permit the ends of the arms at the open end of the U to be permanently fastened to the stationary element and to permit making the current connections to such ends. The movable pointer or movable contact, as the case may be, is then attached to the yoke portion of the U and, of course, deflects as variations in current flowing through the bimetallic strips cause variations in temperature thereof and tend to cause the strip to warp or twist in one direction or the other.

In accordance with my invention in its preferred form, I also make use of a similar construction but I add an additional arm to form an E-shaped member instead of a simple U-shaped member and the additional arm carries no current but is, of course, influenced by variations in temperature of the other two arms. The free end of the non-current carrying arm serves as the support for movable contacts or the deflecting pointer. Variations in temperature tend to deflect the end of the current-free arm in a direction opposite that which will be caused by the twisting of the current-carrying arms. Consequently, the current-free arm serves to compensate for variations in ambient temperature.

In addition to this effect, however, owing to the gradual heating of the current-free arm from the radiation produced by the current-carrying arms, the gradual creepage in deflection of the current-carrying arms, resulting from the fact that the bimetallic strip is not heated instantaneously by the current, is largely overcome by the opposite creepage of the current-free arms so that the pointer reaches its ultimate indicating position much more quickly than would be the case in ordinary bimetallic strip indicating instruments.

The features of my invention which I believe to be novel and patentable will be pointed out in the claims appended hereto. A better understanding of my invention, itself, however, may be obtained from the following description taken in connection with the accompanying drawing in which Fig. 1 represents schematically in perspective a fundamental form of apparatus embodying my invention; Fig. 2 represents the modification of the fundamental form in which the bimetallic strip is coiled for the sake of greater compactness; Fig. 3 represents another embodiment of my invention; Fig. 4 represents still another embodiment of my invention; and Fig. 5 is a graph showing the relationship between the deflection of the bimetallic strips and time, and explaining the principle of operation of my invention.

Referring now more in detail to the drawing in which like reference characters are utilized to designate like parts throughout, in Figs. 1 to 4, the torque-producing element of my current-responsive device comprises an E-shaped sheet of bimetal 11. By the term E-shaped as used in the description and claims, I mean formed from a sheet the development of which is a figure consisting of three arms, free at one end and joined by a yoke at the other end to simulate an E or two U's moved together, as illustrated in Fig. 1. Although separate strips of bimetal may be employed, I find it convenient and satisfactory to stamp the three-legged or E-shaped figures for the torque-producing elements directly from a sheet of bimetal.

The bimetal to which I refer is a well known article of commerce and consists of two sheets or strips of materials having different temperature coefficients of expansion laid together and united along their common surfaces in any suitable manner as by welding. For example, brass and steel are commonly employed and, in that case, since brass has the greater temperature coefficient of expansion, as the temperature rises, the bimetal would bend away from the side composed of brass and, as the temperature decreases, it would bend away from the side composed of steel.

Preferably, the yoke portion 12 of the bimetal element 11 is strengthened and also prevented from bending by channeling or crimping as illustrated. For a reason which will be explained hereinafter, I find that it may also be desirable to crimp or channel the end portions 13 of the current-carrying arms of the bimetal member 11. The channeled ends 13 are fastened to current terminals 14 rigidly supported in the stationary portion of the apparatus, not shown, and current is led to the device through conductors 15. The free or non-current carrying arm 16 may carry a contact or, as shown, an indicating pointer 17 cooperating with a suitable scale 18.

In the arrangement of Fig. 2, the bimetallic element 11 is coiled up to form three spirals after it has been stamped from the sheet of bimetal but it will be understood that there is no difference in the principle of operation since a given bend per unit length of the bimetallic strips results in the same angle of twist at the unsupported end regardless of the original shape of the strip, unless the radius of curvature is very small, smaller than is used here in the active portions of the bimetal.

As the current is led through conductors 15, arms 19, and yoke 12, the unsupported ends of the arms 19 and the yoke portion 12 are obviously deflected in one direction or the other by reason of the heating of arms 19 caused by the current. The temperature, however, rises exponentially with time so that the deflection of the unsupported ends of the strips 19 also varies exponentially with time, as shown in curve 20 of Fig. 5. The ultimate position of the pointer would, therefore, not be attained for a considerable period after current has started to flow in the arms 19 if the indicating pointer were connected to the yoke 12. The actual ultimate position would correspond to that at which heat dissipation from arms 19 equaled the heat energy supplied by the current flowing in arms 19, which would theoretically occur after an infinite period of time. However, after a certain finite period of time, further change in position would become inappreciable. In practice, it has been found that only after six or seven minutes does no further appreciable deflection occur.

The arm 16 being situated between the current-carrying arms 19 obviously is gradually heated by heat given off by arms 19 and, since it is supported at the opposite end with respect to the current-carrying arms 19, the deflection of the pointer 17 due to heating of arm 16 tends to be in a direction opposite that produced by the heating of the arms 19. The deflection of pointer 17 due to the heating of arm 16 alone is represented by curve 21 of Fig. 5. It will be seen that this component of the deflection also increases exponentially and does not attain its apparent ultimate value until a lapse of a considerable length of time, for example, six or seven minutes. The actual deflection of the pointer 17, however, is the difference between the components of deflection 20 and deflection 21 produced by the heating of arms 19 and 16, respectively. The latter portions of curves 20 and 21 in which change of deflection is relatively gradual tend substantially to cancel each other so that, after a relatively short period of time, for example, after about one and one-half minutes in one actual instrument, at the instant represented by the point 22, the pointer 17 ceases to be appreciably further deflected and its scale position remains substantially constant as shown by curve 23.

Owing to the discontinuity necessarily introduced in the heat flow path by the presence of the terminals 14, there will be a difference in temperature between the ends 13 of the bimetal strip and the terminals 14. The greater mass and lower resistance of terminals 14 will tend to cause them to heat more slowly, and, consequently, to cool the adjacent ends 13 of bimetal strip. As the terminals 14 become heated, however, owing to the flow of heat from the adjacent bimetallic strip, the terminals 14 will have less cooling effect. This additional temperature variation in the portions 13 of the bimetallic strip would introduce a supplementary bending in these portions if they were not channeled. This temperature variation would, consequently, cause a creep in the deflection and introduce another factor, causing a lag in the ultimate scale position of the pointer 17. However, owing to the fact that the ends 13 are channeled, the portions of the bimetallic strip, the temperature of which is effected by heat absorption in the terminals 14, are prevented from bending and, since there is no discontinuity between the channel portions 13 and the remainder of the bimetallic strips 19, the temperature along the strip in this section is substantially uniform and no creep can result.

In the arrangements of Figs. 1 and 2, I have shown bimetallic torque-producing elements in which the outer arms 19 carry the current and the inner compensating arm 16 carries the deflecting pointer. It will be understood, however, that my invention is not limited to this precise arrangement. In Fig. 3, for example, the two lower arms 24 are the current-carrying arms and the upper arm 25 carries the pointer 17. In either arrangement, the arm carrying the pointer 17 is heated by heat given off by the arms carrying the current.

As explained in connection with Figs. 1 and 2, the shape into which the sheet forming the bimetallic torque-producing element 11 is initially bent does not affect the operation of the device. If it is desired to provide a relatively flat torque-producing element, for example, the arrangement of Fig. 4 may be employed in which the sheet forming the torque element 11 is bent back to have a zigzag or flattened Z-shaped section.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A current-responsive instrument comprising in combination, an E-shaped sheet of bimetal, stationary supporting current connections at the ends of two of the arms forming said E, a pointer attached to the remaining arm of said E, and a scale cooperating therewith.

2. A current-responsive device comprising in combination, an E-shaped sheet of bimetal supported and connected at the ends of two of its arms forming the E to an electrical circuit to the current in which the device is intended to respond and means responsive to movement of the end of the said remaining arm, said remaining arm being exposed to heat dissipated from the circuit-connected arms, whereby the circuit-connected arms tend to bend due to heating in response to variations in current in said device but the end of the remaining arm tends to move oppositely with respect to the others when heated by heat dissipation from them, whereby creepage due to gradual approach to ultimate temperature by said arms is compensated, and the time lag of response is diminished.

3. In a current-responsive device, a torque-producing element comprising a pair of bimetallic strips joined at one end to form a member having a U-shaped developed surface and supported at the mechanically unconnected ends, and terminals attached to said last mentioned ends serving to provide current connections, the ends of said bimetallic strips adjacent said terminals being channeled to prevent variation in tendency to bend which would be caused by flow of heat from said bimetallic strips to said terminals.

4. In a current-responsive device, a force-producing element comprising an E-shaped sheet of bimetal supported and connected at the ends of two of its arms forming the E to an electrical circuit to the current in which the device is intended to respond, the remaining arm being exposed to heat dissipated from the circuit-connected arms, whereby the free end of said remaining arm tends to move with less time lag in response to variations in current in said device than the portion of the E mechanically joining its three arms.

5. In a current-responsive device, a force-producing element comprising in combination, a sheet of bimetal having three arms joined at one end to form a member having an E-shaped developed surface and supported at the ends of two of its arms at the open portion of the E, and terminals attached to said two last mentioned ends serving to provide current connections, the ends of said arms adjacent said terminals being channeled to prevent variation in tendency to bend which would be caused by flow of heat from said bimetallic arms to said terminals.

6. In a current-responsive device, a force-producing element comprising in combination an E-shaped sheet of bimetal connected at the ends of its two outer arms forming the E to an electrical circuit to the current in which the device is intended to respond, the middle arm being exposed to heat dissipated from one of said outer arms, whereby the outer arms tend to bend in response to variations in current in said device but the middle arm also tends to bend when heated from said outer arms, moving its end oppositely with respect to the other arms, thereby compensating creepage due to gradual approach to ultimate temperature by said arms, and diminishing the time lag of response.

7. In a current-responsive device, a force-producing element comprising an E-shaped sheet of bimetal connected at the ends of two of the adjacent arms forming the E to an electrical circuit to the current in which the device is intended to respond, the remaining arm being exposed to heat dissipated from the circuit-connected arms, whereby the end of the remaining arm tends to move with less time lag in response to variations in current than the portion of the E mechanically joining its three arms.

8. A current-responsive device comprising a sheet of bimetal longitudinally slotted to form a plurality of arms joined at one end of said sheet, a stationary support to which the other end of said sheet is attached, one of said arms being free of said support and being freely suspended from the joined end of said sheet to form a compensating arm, means for subjecting the remainder of said sheet to the heating effect of an electric current, and stationary means cooperating with the end of the remaining arm to produce an effect upon deflection thereof, the current heated portion of said sheet and said compensating arm being so related that heat dissipation from the current-heated portion affects the compensating arm and thereby reduces the time lag of response.

9. A current-responsive device comprising in combination, an E-shaped sheet of bimetal, stationary supporting current connections at the ends of two of the arms forming said E, and stationary means cooperating with the end of the remaining arm to produce an effect upon deflection thereof.

10. In a measuring instrument, a sheet of bimetal of E-shape, supporting current connections for the ends of two of the arms of said E, and means including a graduated scale cooperating with the remaining arm of said E for indicating the deflections thereof; said current-heated arms and said remaining arm being so related that heat radiations from the current-heated arms affect the said remaining arm and thereby reduce the time lag of response.

11. A current-responsive device comprising a sheet of bimetal slotted part way from one end to form a plurality of arms with a connecting portion, a stationary support attached to the unconnected ends of a plurality of said arms, and means for subjecting said attached arms to the heating effect of an electrical current, said sheet including a portion suspended from said connecting portion to form an ambient temperature compensating arm with a free end adapted to deflect in response to variations in current.

12. In a current-responsive device a current-conducting deflectable bimetallic strip and a supporting terminal attached to an end thereof to provide a current connection, the end of said bimetallic strip adjacent said terminal being channeled to prevent variation in tendency to bend which would be caused by flow of heat from said bimetallic strip to said terminal.

13. A current-responsive device comprising in combination, a deflecting element of the bimetallic type including resistance material and adapted to deform in response to heating effects of an electric circuit in said resistance material, a second bimetallic element, said elements being oppositely movable in response to ambient temperature changes, and a movable connection between said elements for causing algebraic addition of the movements of said elements, said elements being so related that heat dissipated from said resistance material affects said second element to compensate creepage due to gradual approach to ultimate temperature by said elements and to diminish time lag of response to variations in current of the net motion of said elements in comparison with the time lag of response of the first element alone.

14. In a current-responsive instrument a deflection producing element comprising a connecting yoke and three bimetallic strips each having one end thereof joined to said yoke, supporting current connections for the unjoined ends of two of the strips, and stationary means cooperating with the free end of the remaining strip responsive to the deflections thereof, said current heated strips and said remaining strip being so related that heat radiations from the current-heated strips affect the said remaining strip and thereby reduce the time lag of response.

15. A current-responsive device comprising a bimetallic deflectable member supported at one end, means for causing said member to be heated relatively abruptly an amount dependent upon the magnitude of the current to be measured, a second bimetallic member supported at the other end of said first bimetallic member so as to be deflected in the opposite direction by heating thereof, and means for causing said second member to be heated relatively gradually an amount less than the heating of said first member and dependent upon the magnitude thereof.

THEODORE A. RICH.